US011036427B2

(12) United States Patent
Sallese et al.

(10) Patent No.: US 11,036,427 B2
(45) Date of Patent: Jun. 15, 2021

(54) USING CONTENT ADDRESSABLE MEMORY TO PERFORM READ-MODIFY-WRITE OPERATIONS IN NON-VOLATILE RANDOM ACCESS MEMORY (NVRAM)

(71) Applicant: International Business Machines Corporation, Armonk, NY (US)

(72) Inventors: Kevin E. Sallese, Plainfield, IL (US); Timothy J. Fisher, Cypress, TX (US)

(73) Assignee: International Business Machines Corporation, Armonk, NY (US)

( * ) Notice: Subject to any disclaimer, the term of this patent is extended or adjusted under 35 U.S.C. 154(b) by 84 days.

(21) Appl. No.: 16/375,690

(22) Filed: Apr. 4, 2019

(65) Prior Publication Data

US 2020/0319821 A1    Oct. 8, 2020

(51) Int. Cl.
  *G06F 3/06*    (2006.01)
  *G06F 12/10*    (2016.01)

(52) U.S. Cl.
  CPC .......... *G06F 3/0659* (2013.01); *G06F 3/0604* (2013.01); *G06F 3/068* (2013.01); *G06F 12/10* (2013.01); *G06F 2212/7201* (2013.01)

(58) Field of Classification Search
  CPC ...... G06F 3/0659; G06F 3/0604; G06F 3/068; G06F 12/10; G06F 2212/7201
  See application file for complete search history.

(56) References Cited

U.S. PATENT DOCUMENTS 5,434,818 A  *  7/1995  Byers ................. G11C 7/1075
                                                   365/189.04
7,418,543 B2      8/2008  Jain et al.
(Continued)

FOREIGN PATENT DOCUMENTS

EP       3324288 A1    5/2018
JP       4519213 B2    8/2010

OTHER PUBLICATIONS

Pan et al., "Grouping-based Elastic Striping with Hotness Awareness for Improving SSD RAID Performance," 45th Annual IEEE/IFIP International Conference on Dependable Systems and Networks, 2015, pp. 160-171.

(Continued)

*Primary Examiner* — Nanci N Wong
(74) *Attorney, Agent, or Firm* — Zilka-Kotab. P.C.

(57) ABSTRACT

A computer-implemented method, according to one embodiment, includes: receiving a data access command which corresponds to data stored on NVRAM at a logical block address, and using content-addressable memory (CAM) to determine whether the logical block address corresponds to an active read modify write operation. In response to determining that the logical block address corresponds to an active read modify write operation, the data access command is satisfied using a first procedure. However, in response to determining that the logical block address does not correspond to an active read modify write operation, the data access command is satisfied using a second procedure. Moreover, using the CAM to determine whether the logical block address corresponds to an active read modify write operation is completed in a single clock cycle of the CAM.

18 Claims, 10 Drawing Sheets

(56) References Cited

U.S. PATENT DOCUMENTS

| | | | | |
|---|---|---|---|---|
| 8,601,205 B1* | 12/2013 | Menon | ................... | G11C 15/00 |
| | | | | 711/105 |
| 9,116,796 B2 | 8/2015 | Sprouse et al. | | |
| 9,792,988 B2 | 10/2017 | Maes, II | | |
| 2014/0164677 A1* | 6/2014 | Borchers | ............... | G06F 3/0658 |
| | | | | 711/103 |
| 2014/0281121 A1* | 9/2014 | Karamcheti | .......... | G06F 9/4881 |
| | | | | 711/102 |
| 2017/0075823 A1* | 3/2017 | Ward | .................... | G06F 3/0619 |
| 2019/0080762 A1* | 3/2019 | Kim | ................... | G11C 13/0004 |

OTHER PUBLICATIONS

Ruan et al., "Transactional Read-Modify-Write Without Aborts," ACM Transactions on Architecture and Code Optimization, vol. 11, No. 4, Article 63, Jan. 2015, pp. 63:1-63:24.

Agrawal et al., "Design Tradeoffs for SSD Performance," USENIX Annual Technical Conference, 2008, pp. 57-70.

* cited by examiner

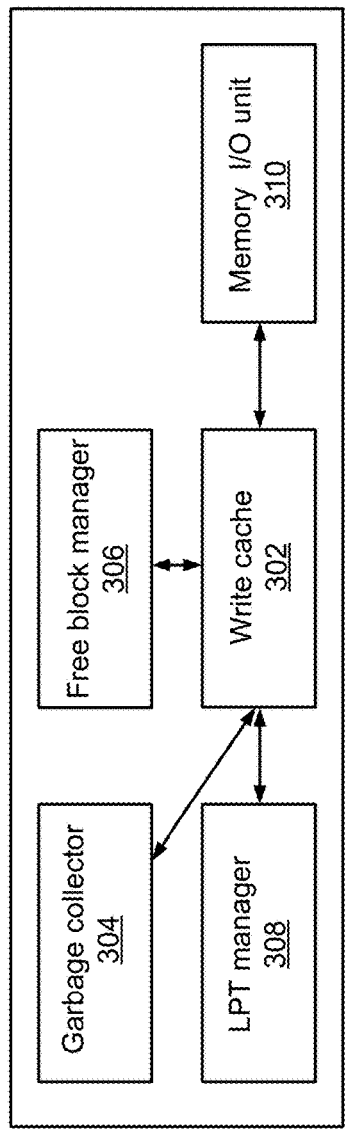
FIG. 3
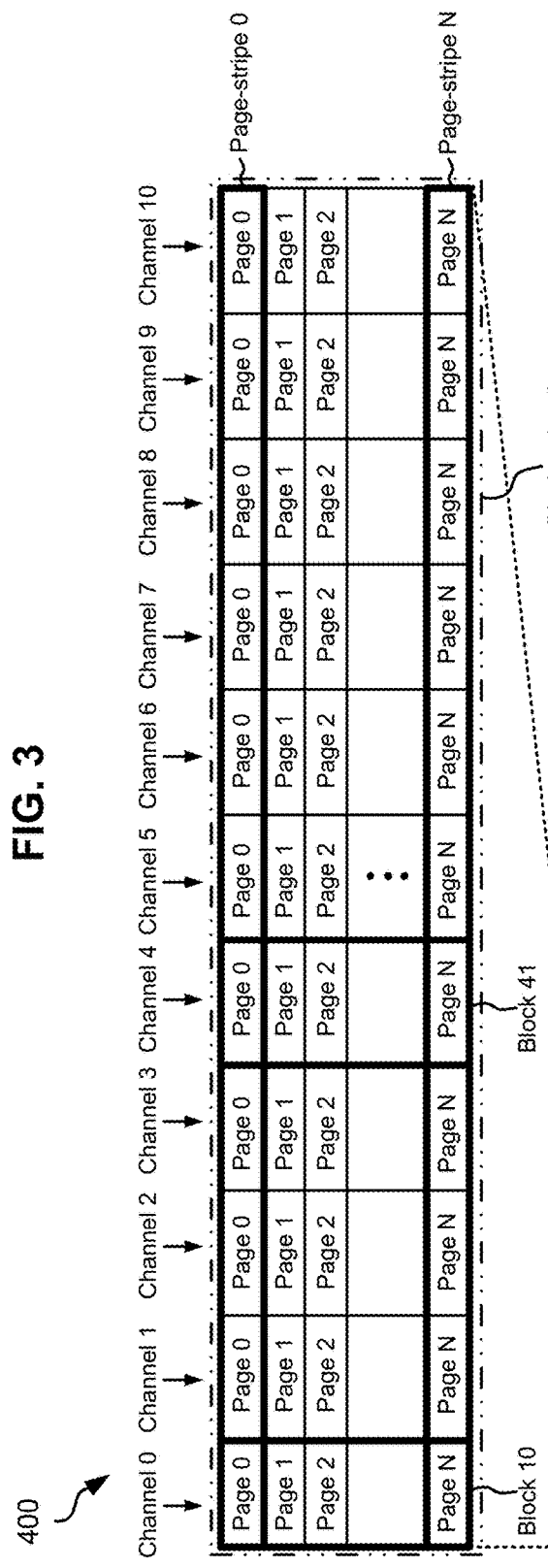
FIG. 4
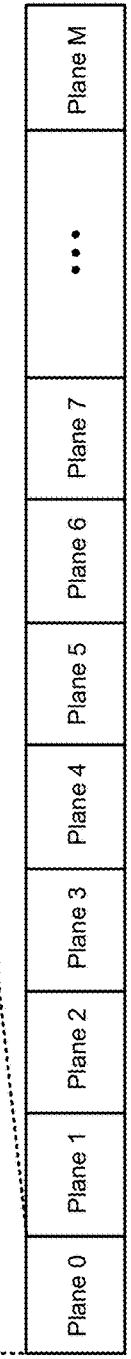

| Addr | Valid [1](42) | Read Comp Drop [1](41) | Read Pending [1](40) | Buff_State [8](39:31) | LBA [31](31:0) |
|---|---|---|---|---|---|
| 0 | | | | | |
| 1 | | | | | |
| ⋮ | ⋮ | ⋮ | ⋮ | ⋮ | ⋮ |
| n | | | | | |

USING CONTENT ADDRESSABLE MEMORY TO PERFORM READ-MODIFY-WRITE OPERATIONS IN NON-VOLATILE RANDOM ACCESS MEMORY (NVRAM)

BACKGROUND

The present invention relates to data storage systems, and more particularly, this invention relates to performing read-modify-write (RMW) operations in NVRAM.

NVRAM is a type of random-access memory which retains information stored thereon even after the power supply is turned off, and includes a number of different forms. Using Flash memory as an example, the performance characteristics of conventional NAND Flash-based solid state drives (SSDs) are fundamentally different from those of traditional hard disk drives (HDDs). Data in conventional SSDs is typically organized in pages of 4, 8, or 16 kilobyte (KB) sizes. Moreover, page read operations in SSDs are typically one order of magnitude faster than write operations and latency neither depends on the current nor the previous location of operations.

However, in Flash-based SSDs, memory locations are erased in blocks prior to being written to. The size of an erase block unit is typically 256 pages and the erase operations take approximately one order of magnitude more time than a page program operation. Due to the intrinsic properties of NAND Flash, Flash-based SSDs write data out-of-place whereby a mapping table maps logical addresses of the written data to physical ones. This mapping table is typically referred to as the Logical-to-Physical Table (LPT).

As Flash-based memory cells exhibit read errors and/or failures due to wear or other reasons, additional redundancy may be used within memory pages as well as across memory chips (e.g., RAID-5 and RAID-6 like schemes). The additional redundancy within memory pages may include error correction code (ECC) which, for example, may include BCH codes. While the addition of ECC in pages is relatively straightforward, the organization of memory blocks into RAID-like stripes is more complex. For instance, individual blocks are retired over time which requires either reorganization of the stripes, or capacity reduction of the stripe. As the organization of stripes together with the LPT defines the placement of data, SSDs typically utilize a Log-Structured Array (LSA) architecture, which combines these two methods.

The LSA architecture relies on out-of-place writes. In this approach, a memory page overwrite will result in writing the memory page data to a new location in memory, marking the old copy of the memory page data as invalid, and then updating the mapping information. Due to the limitations of current NAND memory technology, an invalidated data location cannot be reused until the entire block it belongs to has been erased. Before erasing, though, the block undergoes garbage collection, whereby any valid data in the block is relocated to a new block. Garbage collection of a block is typically deferred for as long as possible to maximize the amount of invalidated data in block, and thus reduce the number of valid pages that are relocated, as relocating data causes additional write operations, and thereby increases write amplification.

SUMMARY

A computer-implemented method, according to one embodiment, includes: receiving a data access command which corresponds to data stored on NVRAM at a logical block address, and using content-addressable memory (CAM) to determine whether the logical block address corresponds to an active read modify write operation. In response to determining that the logical block address corresponds to an active read modify write operation, the data access command is satisfied using a first procedure. However, in response to determining that the logical block address does not correspond to an active read modify write operation, the data access command is satisfied using a second procedure. Moreover, using the CAM to determine whether the logical block address corresponds to an active read modify write operation is completed in a single clock cycle of the CAM.

A computer program product, according to another embodiment, includes a computer readable storage medium having program instructions embodied therewith. The program instructions are readable and/or executable by a processor to cause the processor to: perform the foregoing method.

A system, according to yet another embodiment, includes: a plurality of NVRAM blocks configured to store data, and a processor and logic integrated with and/or executable by the processor. The logic is configured to: receive, by the processor, a data access command which corresponds to data stored on NVRAM at a logical block address; and use, by the processor, CAM to determine whether the logical block address corresponds to an active read modify write operation by determining whether the logical block address is currently stored in the CAM. In response to determining that the logical block address corresponds to an active read modify write operation, the data access command is satisfied, by the processor, using a first procedure. However, in response to determining that the logical block address does not correspond to an active read modify write operation, the data access command is satisfied, by the processor, using a second procedure. Moreover, using the CAM to determine whether the logical block address corresponds to an active read modify write operation is completed in a single clock cycle of the CAM irrespective of a size of the CAM.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 3 is a system diagram, in accordance with one embodiment.

FIG. 4 is a conceptual diagram which includes a block-stripe and page-stripe, in accordance with one embodiment.

DETAILED DESCRIPTION

Figure 1:
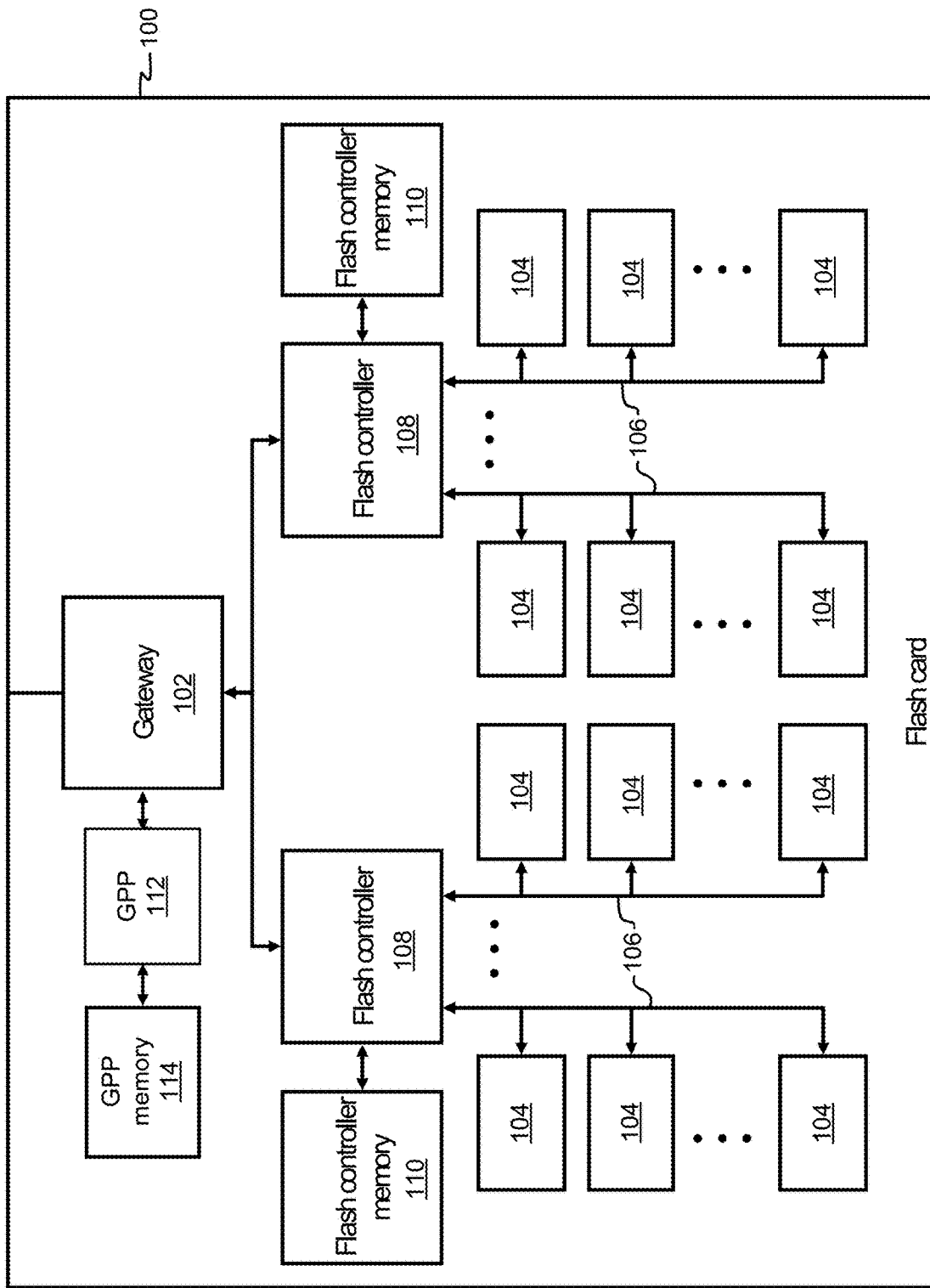
FIG. 1 is a diagram of a non-volatile memory card, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of data storage systems, as well as operation and/or component parts thereof. It should be appreciated that various embodiments herein can be implemented with a wide range of memory mediums, including for example NVRAM technologies such as NAND Flash memory, NOR Flash memory, phase-change memory (PCM), magnetoresistive RAM (MRAM) and resistive RAM (RRAM). To provide a context, and solely to assist the reader, various embodiments may be described with reference to a type of non-volatile memory. This has been done by way of example only, and should not be deemed limiting on the invention defined in the claims.

In one general embodiment, a computer-implemented method includes: receiving a data access command which corresponds to data stored on NVRAM at a logical block address, and using content-addressable memory (CAM) to determine whether the logical block address corresponds to an active read modify write operation. In response to determining that the logical block address corresponds to an active read modify write operation, the data access command is satisfied using a first procedure. However, in response to determining that the logical block address does not correspond to an active read modify write operation, the data access command is satisfied using a second procedure. Moreover, using the CAM to determine whether the logical block address corresponds to an active read modify write operation is completed in a single clock cycle of the CAM.

In another general embodiment, a computer program product includes a computer readable storage medium having program instructions embodied therewith. The program instructions are readable and/or executable by a processor to cause the processor to: perform the foregoing method.

In yet another general embodiment, a system includes: a plurality of NVRAM blocks configured to store data, and a processor and logic integrated with and/or executable by the processor. The logic is configured to: receive, by the processor, a data access command which corresponds to data stored on NVRAM at a logical block address; and use, by the processor, CAM to determine whether the logical block address corresponds to an active read modify write operation by determining whether the logical block address is currently stored in the CAM. In response to determining that the logical block address corresponds to an active read modify write operation, the data access command is satisfied, by the processor, using a first procedure. However, in response to determining that the logical block address does not correspond to an active read modify write operation, the data access command is satisfied, by the processor, using a second procedure. Moreover, using the CAM to determine whether the logical block address corresponds to an active read modify write operation is completed in a single clock cycle of the CAM irrespective of a size of the CAM.

FIG. 1 illustrates a memory card 100, in accordance with one embodiment. It should be noted that although memory card 100 is depicted as an exemplary non-volatile data storage card in the present embodiment, various other types of non-volatile data storage cards may be used in a data storage system according to alternate embodiments. It follows that the architecture and/or components of memory card 100 are in no way intended to limit the invention, but rather have been presented as a non-limiting example.

Moreover, as an option, the present memory card 100 may be implemented in conjunction with features from any other embodiment listed herein, such as those described with reference to the other FIGS. However, such memory card 100 and others presented herein may be used in various applications and/or in permutations which may or may not be specifically described in the illustrative embodiments listed herein. Further, the memory card 100 presented herein may be used in any desired environment.

With continued reference to FIG. 1, memory card 100 includes a gateway 102, a general purpose processor (GPP) 112 (such as an ASIC, FPGA, CPU, etc.) connected to a GPP memory 114 (which may comprise RAM, ROM, battery-backed DRAM, phase-change memory PC-RAM, MRAM, STT-MRAM, etc., or a combination thereof), and a number of memory controllers 108, which include Flash controllers in the present example. Each memory controller 108 is connected to a plurality of NVRAM memory modules 104 (which may comprise NAND Flash or other non-volatile memory type(s) such as those listed above) via channels 106.

According to various embodiments, one or more of the controllers 108 may be or include one or more processors, and/or any logic for controlling any subsystem of the memory card 100. For example, the controllers 108 typically control the functions of NVRAM memory modules 104 such as, data writing, data recirculation, data reading, etc. The controllers 108 may operate using logic known in the art, as well as any logic disclosed herein, and thus may be considered as a processor for any of the descriptions of non-volatile memory included herein, in various embodiments.

Moreover, the controller 108 may be configured and/or programmable to perform or control some or all of the methodology presented herein. Thus, the controller 108 may be considered to be configured to perform various operations by way of logic programmed into one or more chips, modules, and/or blocks; software, firmware, and/or other instructions being available to one or more processors; etc., and combinations thereof.

Referring still to FIG. 1, each memory controller 108 is also connected to a controller memory 110 which preferably includes a cache which replicates a non-volatile memory structure according to the various embodiments described herein. However, depending on the desired embodiment, the controller memory 110 may be battery-backed DRAM, phase-change memory PC-RAM, MRAM, STT-MRAM, etc., or a combination thereof.

Figure 2:
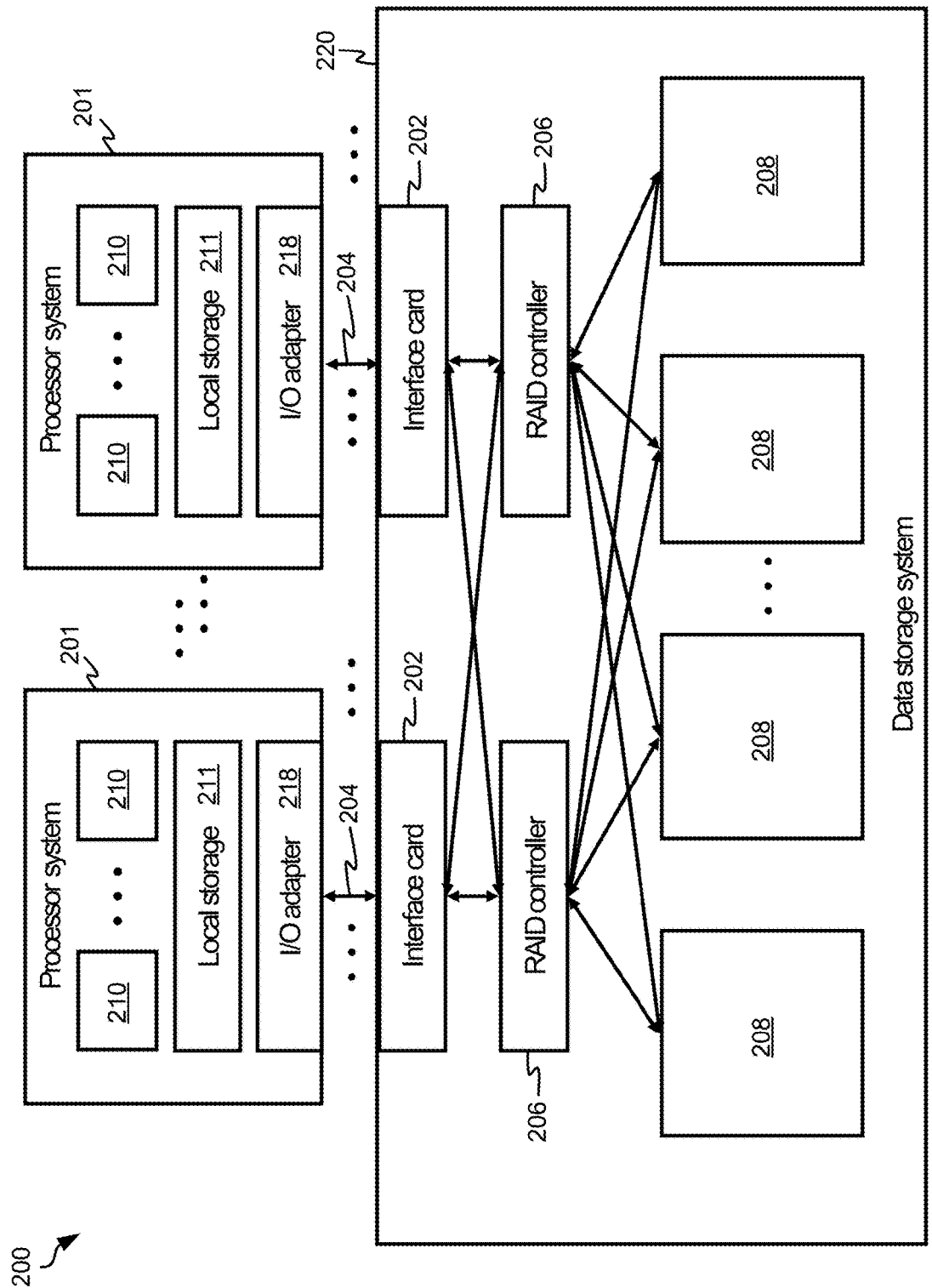
FIG. 2 is a diagram of a data storage system architecture, in accordance with one embodiment.

As previously mentioned, memory card 100 may be implemented in various types of data storage systems, depending on the desired embodiment. FIG. 2 illustrates a data storage system architecture 200 according to an exemplary embodiment which is in no way intended to limit the invention. Moreover, it should be noted that the data storage system 220 of FIG. 2 may include various components found in the embodiment of FIG. 1.

Looking to FIG. 2, the data storage system 220 comprises a number of interface cards 202 configured to communicate via I/O interconnections 204 to one or more processor systems 201. The data storage system 220 may also comprise one or more RAID controllers 206 configured to control data storage in a plurality of non-volatile data storage cards 208. The non-volatile data storage cards 208 may comprise NVRAM, Flash memory cards, RAM, ROM, and/or some other known type of non-volatile memory.

The I/O interconnections 204 may include any known communication protocols, such as Fiber Channel (FC), FC over Ethernet (FCoE), Infiniband, Internet Small Computer System Interface (iSCSI), Transport Control Protocol/Internet Protocol (TCP/IP), Peripheral Component Interconnect Express (PCIe), etc., and/or any combination thereof.

The RAID controller(s) 206 in the data storage system 220 may perform a parity scheme similar to that employed by RAID-5, RAID-10, or some other suitable parity scheme, as would be understood by one of skill in the art upon reading the present descriptions.

Each processor system 201 comprises one or more processors 210 (such as CPUs, microprocessors, etc.), local data storage 211 (e.g., such as RAM 814 of FIG. 8, ROM 816 of FIG. 8, etc.), and an I/O adapter 218 configured to communicate with the data storage system 220.

Referring again to FIG. 1, memory controllers 108 and/or other controllers described herein (e.g., RAID controllers 206 of FIG. 2) may be able to perform various functions on stored data, depending on the desired embodiment. Specifically, memory controllers may include logic configured to perform any one or more of the following functions, which are in no way intended to be an exclusive list. In other words, depending on the desired embodiment, logic of a storage system may be configured to perform additional or alternative functions, as would be appreciated by one skilled in the art upon reading the present description.

Garbage Collection

Garbage collection in the context of SSD memory controllers of the present description may include the process of identifying blocks of data to be reclaimed for future usage and relocating all pages that are still valid therein. Moreover, depending on the specific controller and/or the respective garbage collection unit of operation, LEBs may be identified for being reclaimed and/or relocated. Typically, one LEB corresponds to one block stripe, but alternative implementations may consider a fixed number of block stripes building a LEB as well.

A physical "block" represents a minimal unit that may be erased on non-volatile memory, e.g., such as NAND Flash memory, and thereby prepared for writing data thereto. However, a typical garbage collection unit of operation is often a multiple of the physical blocks of non-volatile memory, and is also referred to herein as a LEB. This is due to the fact that typically RAID-like parity information is added in LEBs. Therefore, in case of a page or block failure data can only be rebuilt when all blocks in the LEB are still holding data. Accordingly, the individual blocks from the garbage collection unit can only be erased either individually or in a single unit once all still valid data from all blocks in the LEB has been relocated successfully to new locations. Hence, the full garbage collection units are garbage-collected as a single unit. Moreover, the size of the LEB directly affects the garbage collection induced write amplification. The larger the LEB, the more likely it becomes that unrelated data are stored together in the LEB, and therefore more of the LEB data may have to be relocated upon garbage collection selection.

Frequently, blocks from different dies and/or flash channels are grouped together, such that blocks from the same group can be read or written in parallel, thereby increasing overall bandwidth. It is also possible to combine the previous two methods, and to compose RAID stripes using blocks from different flash channels that can be accessed in parallel.

It should also be noted that an LEB may include any multiple of the physical memory block, which is a unit of physical erasure. Moreover, the organization of memory blocks into LEBs not only allows for adding RAID-like parity protection schemes among memory blocks from different memory chips, memory planes and/or channels but also allows for significantly enhancing performance through higher parallelism. For instance, multiple non-volatile memory blocks may be grouped together in a RAID stripe. As will be appreciated by one skilled in the art upon reading the present description, RAID schemes generally improve reliability and reduce the probability of data loss.

According to an exemplary embodiment, which is in no way intended to limit the invention, memory controllers (e.g., see 108 of FIG. 1) may internally perform a garbage collection. As previously mentioned, the garbage collection may include selecting a LEB to be relocated, after which all data that is still valid on the selected LEB may be relocated (e.g., moved). After the still valid data has been relocated, the LEB may be erased and thereafter, used for storing new data. The amount of data relocated from the garbage collected LEB determines the write amplification. Moreover, an efficient way to reduce the write amplification includes implementing heat segregation.

Heat Segregation

In the present context, the "write heat" of data refers to the rate (e.g., frequency) at which the data is updated (e.g., rewritten with new data). Memory blocks that are considered "hot" tend to have a frequent updated rate, while memory blocks that are considered "cold" have an update rate slower than hot blocks.

Tracking the write heat of a logical page may involve, for instance, allocating a certain number of bits in the LPT mapping entry for the page to keep track of how many write operations the page has seen in a certain time period or window. Typically, host write operations increase the write heat whereas internal relocation writes decrease the write heat. The actual increments and/or decrements to the write heat may be deterministic or probabilistic.

Similarly, read heat may be tracked with a certain number of additional bits in the LPT for each logical page. To reduce meta-data, read heat can also be tracked at a physical block level where separate counters per block for straddling and non-straddling reads can be maintained. However, it should be noted that the number of read requests to and/or read operations performed on a memory block may not come into play for heat segregation when determining the heat of the memory block for some embodiments. For example, if data is frequently read from a particular memory block, the high read frequency does not necessarily mean that memory block will also have a high update rate. Rather, a high frequency of read operations performed on a given memory block may denote an importance, value, etc. of the data stored in the memory block.

By grouping memory blocks of the same and/or similar write heat values, heat segregation may be achieved. In particular, heat segregating methods may group hot memory pages together in certain memory blocks while cold memory pages are grouped together in separate memory blocks. Thus, a heat segregated LEB tends to be occupied by either hot or cold data.

The merit of heat segregation is two-fold. First, performing a garbage collection process on a hot memory block will prevent triggering the relocation of cold data as well. In the absence of heat segregation, updates to hot data, which are performed frequently, also results in the undesirable relocations of all cold data collocated on the same LEB as the hot data being relocated. Therefore, the write amplification incurred by performing garbage collection is much lower for embodiments implementing heat segregation.

Secondly, the relative heat of data can be utilized for wear leveling purposes. For example, hot data may be placed in healthier (e.g., younger) memory blocks, while cold data may be placed on less healthy (e.g., older) memory blocks relative to those healthier memory blocks. Thus, the rate at which relatively older blocks are exposed to wear is effectively slowed, thereby improving the overall endurance of a given data storage system implementing heat segregation.

Write Allocation

Write allocation includes placing data of write operations into free locations of open LEBs. As soon as all pages in a LEB have been written, the LEB is closed and placed in a pool holding occupied LEBs. Typically, LEBs in the occupied pool become eligible for garbage collection. The number of open LEBs is normally limited and any LEB being closed may be replaced, either immediately or after some delay, with a fresh LEB that is being opened.

During performance, garbage collection may take place concurrently with user write operations. For example, as a user (e.g., a host) writes data to a device, the device controller may continuously perform garbage collection on LEBs with invalid data to make space for the new incoming data pages. As mentioned above, the LEBs having the garbage collection being performed thereon will often have some pages that are still valid at the time of the garbage collection operation; thus, these pages are preferably relocated (e.g., written) to a new LEB.

Again, the foregoing functions are in no way intended to limit the capabilities of any of the storage systems described and/or suggested herein. Rather, the aforementioned functions are presented by way of example, and depending on the desired embodiment, logic of a storage system may be configured to perform additional or alternative functions, as would be appreciated by one skilled in the art upon reading the present description.

Referring now to FIG. 3, a system 300 is illustrated in accordance with one embodiment. As an option, the present system 300 may be implemented in conjunction with features from any other embodiment listed herein, such as those described with reference to the other FIGS. However, such system 300 and others presented herein may be used in various applications and/or in permutations which may or may not be specifically described in the illustrative embodiments listed herein. Further, the system 300 presented herein may be used in any desired environment, e.g., in combination with a controller.

As illustrated, system 300 includes a write cache 302 which is coupled to several other components, including garbage collector 304. As previously mentioned, garbage collector 304 may be used to free LEB units by relocating valid data and providing non-volatile memory blocks to be erased for later reuse. Thus, the garbage collector 304 may reclaim blocks of consecutive physical space, depending on the desired embodiment. According to an exemplary embodiment, block erase units may be used to keep track of and/or complete the erase of non-volatile memory blocks handed over by the garbage collector 304.

Write cache 302 is also coupled to free block manager 306 which may keep track of free non-volatile memory blocks after they have been erased. Moreover, as would be appreciated by one of ordinary skill in the art upon reading the present description, the free block manager 306 may build free stripes of non-volatile memory blocks from different lanes (e.g., block-stripes) using the erased free non-volatile memory blocks.

Referring still to FIG. 3, write cache 302 is coupled to LPT manager 308 and memory I/O unit 310. The LPT manager 308 maintains the logical-to-physical mappings of logical addresses to physical pages in memory. According to an example, which is in no way intended to limit the invention, the LPT manager 308 may maintain the logical-to-physical mappings of 4KiB logical addresses. The memory I/O unit 310 communicates with the memory chips in order to perform low level operations, e.g., such as reading one or more non-volatile memory pages, writing a non-volatile memory page, erasing a non-volatile memory block, etc.

To better understand the distinction between block-stripes and page-stripes as used herein, FIG. 4 is a conceptual diagram 400, in accordance with one embodiment. LEBs are built from block stripes and typically a single block stripe is used to build a LEB. However, alternative embodiments may use multiple block stripes to form an LEB. As an option, the present conceptual diagram 400 may be implemented in conjunction with features from any other embodiment listed herein, such as those described with reference to the other FIGS. However, such conceptual diagram 400 and others presented herein may be used in various applications and/or in permutations which may or may not be specifically described in the illustrative embodiments listed herein. Further, the controller conceptual diagram 400 presented herein may be used in any desired environment. Thus, the exemplary non-volatile memory controller conceptual diagram 400 of FIG. 4 may be implemented in a cache architecture. However, depending on the desired embodiment, the conceptual diagram 400 of FIG. 4 may be implemented in defining the organization of data stored in non-volatile memory. Accordingly, both implementations are described in turn below.

Non-Volatile Memory

Looking now to FIG. 4, the conceptual diagram 400 includes a set of M+1 aggregated planes labeled "Plane 0" through "Plane M". An aggregated plane consists of all physical planes with the same plane index on different channels. It should be noted that aggregated planes are also referred to herein simply as planes.

When implemented with data stored in non-volatile memory, each physical plane on a channel may include a large set of blocks, e.g., typically in the order of 1024, 2048 or more. Moreover, one or more physical planes may also include several additional blocks which may be used as replacement blocks for bad blocks (e.g., blocks performing poorly, blocks having undesirable characteristics, etc.).

In each plane of non-volatile memory, a single block from each channel may form a respective block-stripe. It follows that a number of block-stripes supported by a given embodiment of non-volatile memory may be determined by the number of blocks per plane and the number of planes.

In the exploded view of Plane 0, the conceptual diagram 400 further illustrates a single block-stripe (Block-stripe 0) out of the set of block-stripes supported in the remainder of the planes. Block-stripe 0 of plane 0 is shown as including 11 blocks, one block from each channel labeled "Channel 0" through "Channel 10". It should be noted that the association of blocks to block-stripe can change over time as block-stripes are typically dissolved after they have been garbage collected. Erased blocks may be placed in free block pools, whereby new block-stripes are assembled from blocks in the free block pools when write allocation requests fresh block-stripes. For example, looking to conceptual diagram 400, Block 10 from Channel 0 and Block 41 from Channel 4 are currently associated with the illustrated Block-stripe 0 of Plane 0. Furthermore, the illustrated Block-stripe 0 holds N+1 page-stripes and each block therefore holds N+1 pages labeled "Page 0" through "Page N".

Cache Architecture

Referring still to FIG. 4, each block of pages illustrated in the exploded view of aggregated Plane 0 may constitute a unique block from one channel when implemented in a cache architecture. Similarly, each channel contributes a single, individual block which form a block-stripe. For example, looking to conceptual diagram 400, Block 10 from Channel 0 includes all pages (Page 0 through Page N) therein, while Block 41 from Channel 4 corresponds to all pages therein, and so on.

In the context of a memory controller, e.g., which may be capable of implementing RAID at the channel level, a block-stripe is made up of multiple blocks which amount to a stripe of blocks. Looking still to FIG. 4, the multiple blocks of aggregated Plane 0 constitute Block-stripe 0. While all blocks in a block-stripe typically belong to the same aggregated plane, in some embodiments one or more blocks of a block-stripe may belong to different physical planes. It follows that each aggregated plane may include one or more block-stripe. Thus, according to an illustrative embodiment, Block 0 through Block 10 from different physical planes may constitute a block-stripe.

Regardless of whether the conceptual diagram 400 of FIG. 4 is implemented with non-volatile memory and/or a cache architecture, in different embodiments, the number of pages in each block and/or the number of channels in each plane may vary depending on the desired embodiment. According to an exemplary embodiment, which is in no way intended to limit the invention, a block may include 256 pages, but could include more or less in various embodiments. Analogously, the number of channels per plane and/or the number of planes may vary depending on the desired embodiment.

Referring still to FIG. 4, all pages in a block-stripe with the same page index denote a page-stripe. For example, Page-stripe 0 includes the first page (Page 0) of each channel in Block-stripe 0 of Plane 0. Similarly, Page-stripe N includes the last page (Page N) of each channel in Block-stripe 0 of Plane 0.

As performance capabilities of memory continue to improve, new issues are introduced to the field of data storage. For instance, multi-level cell (MLC) and triple-level cell (TLC) NAND Flash memory devices provide a low-cost and high-performance non-volatile storage medium due to the high data storage density achieved. However, logical to physical translations have been unable to progress at a similar rate and therefore have been unable to effectively support these advances in data storage densities. This limiting factor has driven conventional systems to resort to implementing larger logical page sizes. For example, an 8 KB or 16 KB logical page size has allowed for conventional systems to double or quadruple Flash density without also affecting the size standards of the logical to physical translations.

Implementing a larger logical page size such as 8 KB or 16 KB involves a fairly straightforward hardware design migration, but mitigating the unintended effects of reduced overall system performance due to an increased number read-modify-write (RMW) operations has presented greater challenges. For instance, most storage devices advertise a 512 byte (B) block size to the system, meaning that the storage devices can be accessed on 512B alignment boundaries and written in minimum sized 512B blocks. On the other hand, most existing Flash drives are designed to implement a 4 KB logical page size. Therefore, most existing Flash drives are only accessible on 4 KB alignment boundaries and written to in minimum sized 4 KB chunks.

This discrepancy in access alignment and block size is handled in a software layer within the storage system. For example, an application which attempts a sub-4 KB write operation (i.e., a "partial" write operation which is less than 8 different 512B blocks) in Flash causes software to perform a series of RMW operations. With respect to the present description, the 'R' portion of the RMW operation issues a read request to the Flash drive in order to access pertinent background sectors. These background sectors are thereafter merged with foreground application data in the 'M' portion of the RMW operation. Once the modify operation is complete, the 'W' portion of the RMW operation is able to finally store the data in memory. It follows that a read operation is issued prior to every sub-4 KB write operation, and as a result, write performance is substantially lower when compared to 4 KB aligned block writes (also referred to as a "full" write operation). Furthermore, additional processing overhead involved with searching and maintaining sub-4 KB logical block address (LBA) tables adds even more write latency delays to the process of performing the sub-4 KB write operation.

Once an RMW operation begins for a given LBA, the LBA is retained in a table such that any subsequent block writes to the same LBA can either be blocked until current context is finished or coalesced (i.e., added to the existing foreground data set), depending upon a progress level of the initial partial write operation. Accordingly, the list of LBAs which correspond to active RMW operations is searched prior to performing a new write operation, regardless of whether the write operation is a partial write operation. as the new write operation cannot be issued if there are any existing RMW operations for a same LBA which are already in progress.

However, the process of searching the list of LBAs which correspond to active RMW operations is significantly inefficient in conventional systems. Specifically, conventional systems experience time delays which are directly proportionate to the number of entries in the LBA table. The size of the LBA table is therefore system dependent and involves trade-offs in search time and blocking when full. It should be noted that this added latency incurred as a result of searching the LBA table applies to all write operations, including those having aligned block sizes, as even a full write operation cannot be issued to the drive if there are any existing RMW operations for that same LBA already in progress. Accordingly, as the ratio between logical page size and system block size increase, partial write operation performance issues are magnified.

However, in sharp contrast to the foregoing issues experienced in conventional implementations, various ones of the embodiments included herein are able to improve partial write operation performance by executing the corresponding RMW operations on NVRAM drives in hardware rather than relying on software. Accordingly, a RMW engine can be implemented in the command/data path which will be responsible for ensuring that only full write operation commands and data associated therewith are passed to downstream logic. Moreover, implementing CAM in hardware allows for search operations performed in a LBA table to be completed in a single clock cycle, thereby drastically reducing time delays. As a result, some of the embodiments included herein are able to ensure that read and/or write coherency is maintained for RMW operations while also significantly improving overall efficiency of the storage system, e.g., as will be described in further detail below.

Figure 5:
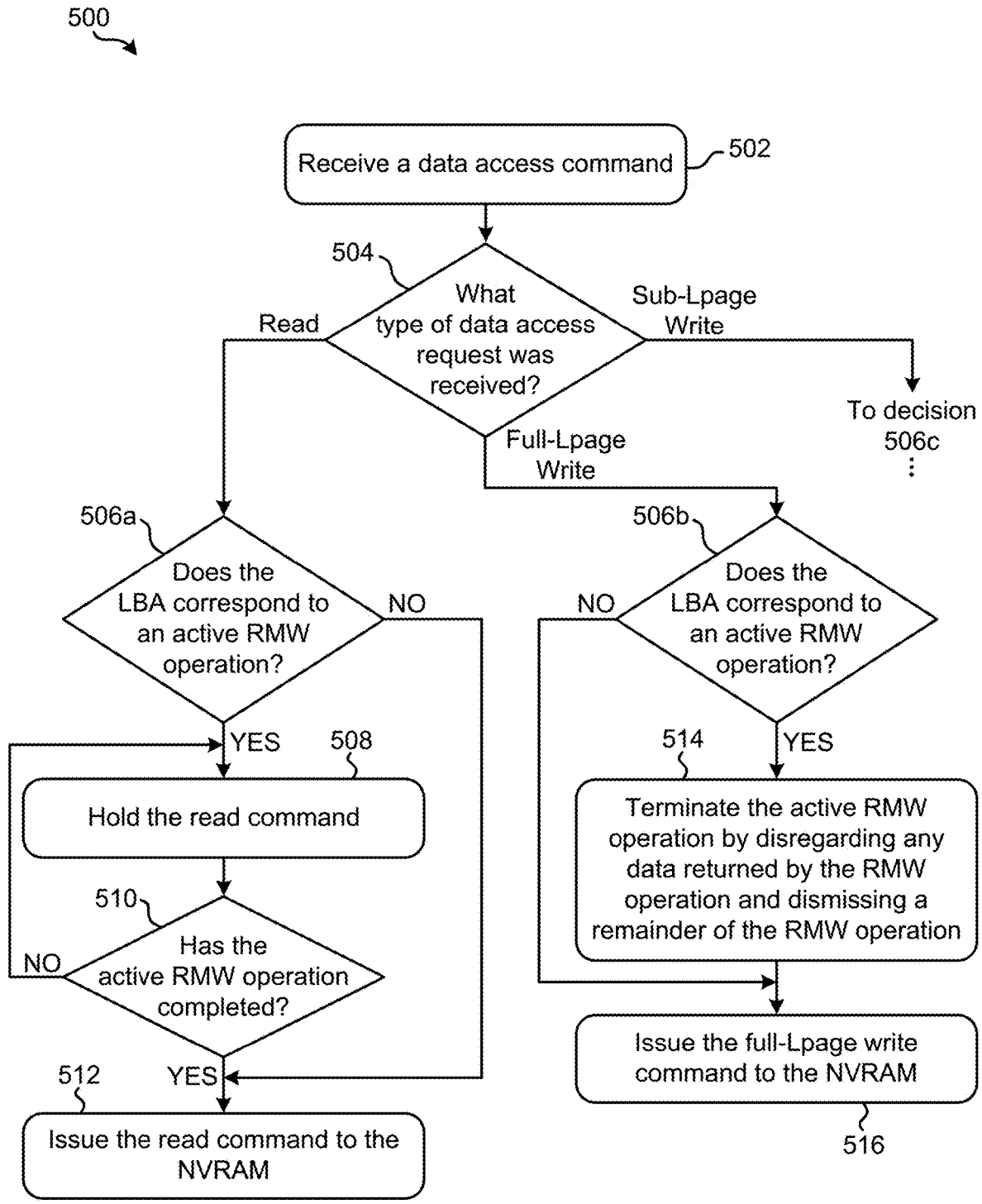
FIG. 5 is a flowchart of a method, in accordance with one embodiment.
Figure 5:
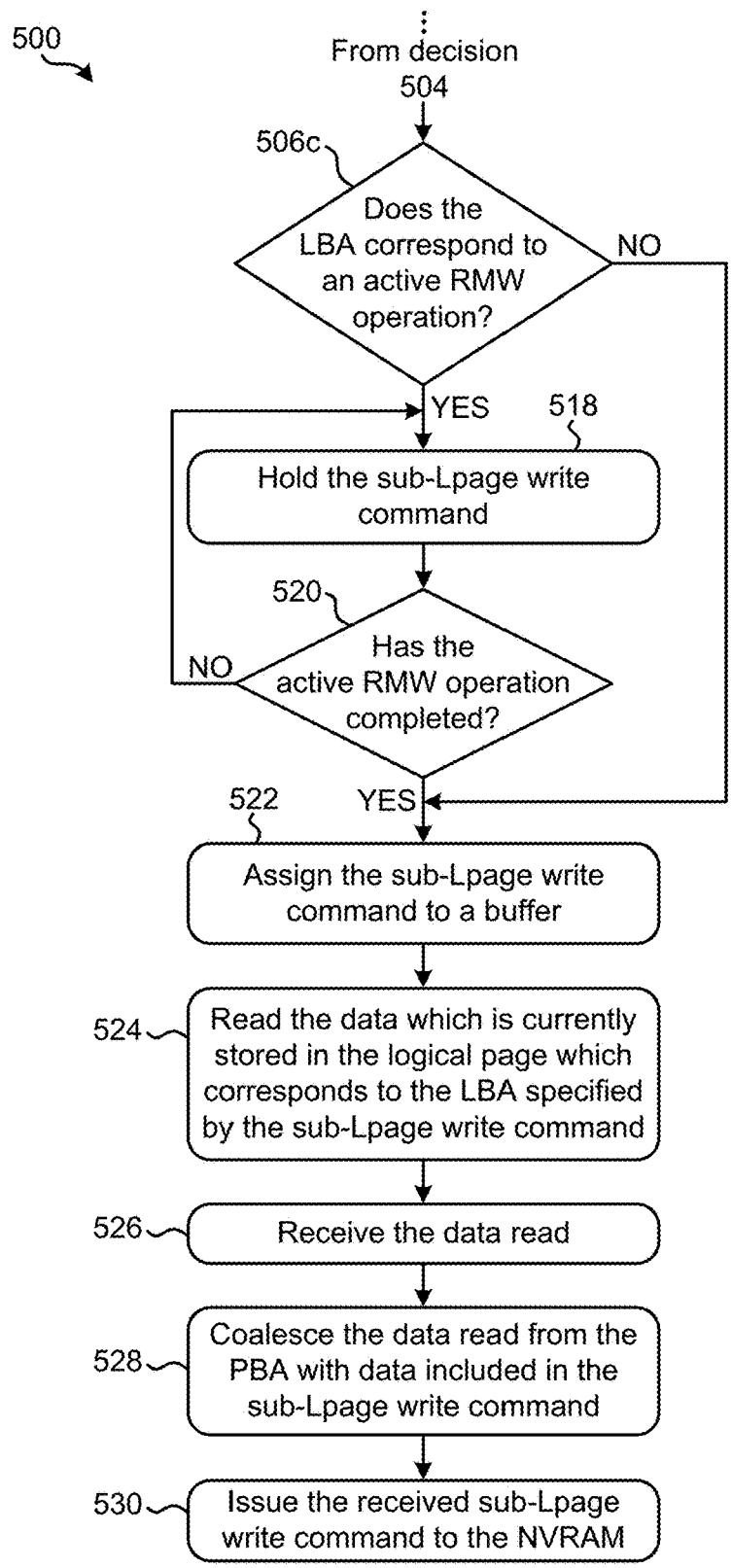

Referring now to FIG. 5, a flowchart of a method 500 for processing data access commands which correspond to data stored on NVRAM is shown according to one embodiment. The method 500 may be performed in accordance with the present invention in any of the environments depicted in FIGS. 1-4 and FIGS. 6-7, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in some embodiments one or more of the processes included in method 500 may be performed by a RMW handler module and/or a controller included therein (e.g., see FIG. 6A below). In various other embodiments, the method 500 may be partially or entirely performed by a controller, a processor, a computer, etc., or some other device having one or more processors therein. Thus, in some embodiments, method 500 may be a computer-implemented method. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, operation 502 of method 500 includes receiving a data access command which corresponds to data stored on NVRAM at a LBA. As mentioned above, the LBA represents the logical address which corresponds to the particular data. The LBA further corresponds to a physical block address (PBA) which represents the physical location in memory (e.g., a specific location in a die and/or chip) at which the particular data is stored. The relationship between logical and PBAs is managed in a LPT in preferred approaches, which is updated accordingly in order to maintain an accurate representation of the data stored in the NVRAM.

The data access command received in operation 502 differs depending on the particular approach. For example, in some approaches the data access command received is a data read operation, while in other approaches the received data access command is a data write operation. Furthermore, a data write operation includes a partial write operation in some situations, while in other situations a data write operation includes a full write operation.

Referring still to method 500, decision 504 includes determining the type of data access command which was received in operation 502. Depending on the type of data access command received, the flowchart follows one of three possible paths. As shown, one of the paths corresponds to read commands, while another one of the paths corresponds to partial write commands (also referred to as "sub-Lpage write commands"), and another of the paths corresponds to full write commands (also referred to as "full-Lpage write commands"). However, it should be noted that these paths are in no way intended to limit the invention. Rather, any number of alternate data access commands may be received and satisfied accordingly. Method 500 may therefore have additional or fewer paths depending on the desired approach.

Referring still to FIG. 5, despite splitting into three possible paths, one of the decisions 506a, 506b, 506c is performed for each of the different types of data access commands received. Specifically, decisions 506a, 506b, 506c each include using CAM to determine whether the LBA corresponds to an active RMW operation. As described above, performing NVRAM read and write operations involves searching a LBA table for in-progress (e.g., active) RMW contexts before determining how a command data pair is to be performed. Conventional implementations experience time delays which are dependent on the size of the LBA table, thereby negatively affecting performance. For example, a 256 entry table introduces 256 clock cycles of delay to the performance of every command performed in conventional systems.

In sharp contrast, by replacing this conventional search control logic with physical CAM, the previously experienced latency can be reduced to a single clock cycle. In fact, this performance delay is reduced to a single clock cycle regardless of the size of the CAM design, e.g., as would be appreciated by one skilled in the art after reading the present description. Accordingly, decisions 506a, 506b, 506c are able to use the LBA associated with the received data command to search the CAM for a matching entry and determine whether such a matching entry exists in a single clock cycle irrespective of a size of the CAM. In other words, decisions 506a, 506b, and 506c involve determining whether the LBA associated with the received data command is already currently stored in the CAM. As mentioned above, this effectively eliminates the performance delays experienced by conventional systems, thereby also drastically improving efficiency.

Looking specifically to the path of method 500 which corresponds to receiving a read command, the flowchart proceeds from decision 506a to operation 508 in response to determining that the LBA corresponds to an active RMW operation. In other words, the flowchart proceeds from decision 506a to operation 508 in response to determining that the LBA which corresponds to the read command received in operation 502 was identified in the LBA table, thereby indicating that the LBA is already subject to an active RMW operation. Determining whether the LBA corresponds to an active RMW operation involves searching a sub-Lpage state table (SLST) for an entry which corresponds to the same LBA in some approaches. Moreover, during the searching, a "read pending" bit is set in the table for the respective entry such that once any existing operations (e.g., RMW operations) are completed, the received read command may be satisfied.

As shown, operation 508 includes holding (e.g., delaying) the read command. In some approaches the read command is held in a queue. Moreover, the read command is preferably held until the active RMW operation is completed. Accordingly, operation 508 may include holding the read command for a predetermined amount of time before determining whether the active RMW operation has completed in decision 510. In response to determining that the active RMW operation has not completed, method 500 returns to operation 508, e.g., such that the read command is held again for a predetermined amount of time. Depending on the approach, the amount of time may be predetermined by a user, based on a current stage of the active RMW operation, based on industry standards, based on the type of NVRAM (e.g., NAND Flash), etc.

However, in response to determining that the active RMW operation has been completed, method 500 proceeds from decision 510 to operation 512. There, operation 512 includes issuing the read command to the NVRAM, e.g., such that it is satisfied. In some approaches the read command is issued to a storage controller of the NVRAM which is capable of performing the read command. In other approaches, one or more instructions are sent to an I/O module coupled to the NVRAM which is capable of extracting the requested data therefrom.

It should also be noted that method 500 jumps directly to operation 512 from decision 506a in response to determining that the LBA does not correspond to an active RMW operation. In other words, the flowchart proceeds directly from decision 506a to operation 512 in response to determining that the LBA which corresponds to the read command received in operation 502 was not identified in the LBA table, thereby indicating that the LBA is not already subject to an active RMW operation.

Looking now to the path of method 500 which corresponds to receiving a full-Lpage write command (e.g., a "full write command"), the flowchart proceeds from decision 506b to operation 514 in response to determining that the LBA corresponds to an active RMW operation. In other words, the flowchart proceeds from decision 506b to operation 514 in response to determining that the LBA which corresponds to the full-Lpage write command received in operation 502 was identified in the LBA table, thereby indicating that the LBA is already subject to an active RMW operation.

As shown, operation 514 includes terminating the active RMW operation by disregarding any data returned by the RMW operation and dismissing a remainder of the RMW operation. In other words, because the entire logical page at the LBA will be rewritten as a result of the full-Lpage write command received in operation 502, any data returned by the active RMW operation will effectively be rendered obsolete as soon as the full-Lpage write command is initiated thereafter. Data returned by the RMW operation is disregarded in some approaches by simply deleting the data, marking the data for garbage collection, indicating the data is unusable, etc. In some approaches, a "drop" bit is set, indicating that any received information is to be dropped (e.g., deleted). Moreover, a remainder of the RMW operation can be dismissed by sending one or more instructions to a command queue, or using any processes which would be apparent to one skilled in the art after reading the present description.

From operation 514, method 500 proceeds to operation 516 which includes issuing the full-Lpage write command to the NVRAM, e.g., such that full-Lpage write command is satisfied. In some approaches the full-Lpage write command is issued to a storage controller of the NVRAM which is capable of writing the data (e.g., storing the data in memory). In other approaches, one or more instructions are sent to an I/O module coupled to the NVRAM which is capable of writing the requested data at the PBA which corresponds to the LBA associated with the received full-Lpage write command, e.g., as would be appreciated by one skilled in the art after reading the present description.

It should also be noted that method 500 jumps directly to operation 516 from decision 506b in response to determining that the LBA does not correspond to an active RMW operation. In other words, the flowchart proceeds directly from decision 506b to operation 516 in response to determining that the LBA which corresponds to the full-Lpage write command received in operation 502 was not identified in the LBA table, thereby indicating that the LBA is not already subject to an active RMW operation.

With continued reference to FIG. 5, the path of method 500 which corresponds to receiving a sub-Lpage write command (e.g., a "partial write command") involves proceeding from decision 506c to operation 518 in response to determining that the LBA corresponds to an active RMW operation. In other words, the flowchart proceeds from decision 506c to operation 518 in response to determining that the LBA which corresponds to the sub-Lpage write command received in operation 502 was identified in the LBA table, thereby indicating that the LBA is already subject to an active RMW operation.

As shown, operation 518 includes holding (e.g., delaying) the sub-Lpage write command. As described above, in some approaches the sub-Lpage write command is held in a queue. Moreover, the sub-Lpage write command is preferably held until the active RMW operation is completed. Because a sub-Lpage write command does not involve writing all data in a given logical page, an active RMW operation may involve making changes to other portions of data that are in the same logical page. Therefore, it is desirable to delay performance of the sub-Lpage write command until the active RMW operation is completed. Accordingly, operation 518 may include holding the sub-Lpage write command for a predetermined amount of time before determining whether the active RMW operation has completed in decision 520.

In response to determining that the active RMW operation has not completed, method 500 returns to operation 518, e.g., such that the sub-Lpage write command is held again for a predetermined amount of time. Depending on the approach, the amount of time may be predetermined by a user, based on a current stage of the active RMW operation, based on industry standards, based on the type of NVRAM (e.g., NAND Flash), etc.

However, in response to determining that the active RMW operation has been completed, method 500 proceeds from decision 520 to operation 522. There, operation 522 includes assigning the sub-Lpage write command to a buffer. The sub-Lpage write command is preferably assigned to a buffer which is in sub-Lpage data memory (SLDM). In some approaches, the sub-Lpage write command is assigned to a SLST in the SLDM. The SLDM is used in some approaches to coalesce the data included in the sub-Lpage write command with a remainder of the data which is also included in the logical page at the LBA. As noted above, logical page represents a minimal unit that may be erased and written to on NVRAM (e.g., such as NAND Flash memory). Thus, the SLDM provides a designated portion of memory which may be used to form a full-Lpage write command, e.g., as would be appreciated by one skilled in the art after reading the present description.

Proceeding to operation 524, method 500 also includes issuing a read command to the NVRAM for the LBA. In other words, operation 524 involves reading the data and/or any other information (e.g., metadata) which is currently stored in the logical page which corresponds to the LBA specified by the sub-Lpage write command. In some approaches, issuing the read command involves accessing a LPT which identifies the PBA at which the data in the LBA is physically stored. However, the process of issuing a read command to the NVRAM may incorporate any one or more of the approaches described above.

Operation 526 further includes receiving the data read from the PBA which is correlated to the LBA, while operation 528 includes coalescing the data read from the PBA with data included in the sub-Lpage write command. As mentioned above, this process of coalescing the data allows for a full-Lpage write command to be formed and implemented accordingly. In some approaches, the data is coalesced in the SLDM by a processor included therein and/or coupled thereto using known data coalescing techniques.

From operation 528, method 500 proceeds to operation 530 which includes actually issuing the received sub-Lpage write command to the NVRAM. However, it should be noted that the sub-Lpage write command is issued along with the data coalesced therewith in operation 528. In other words, operation 530 actually includes issuing a full-Lpage write command which includes the originally received sub-Lpage write command therein. Accordingly, any one or more of the approaches described above with respect to operation 516 may be implemented in order to perform operation 530, e.g., depending on the desired approach.

It follows that the various processes included in method 500 are able to ensure that read and/or write coherency is maintained for RMW operations while also significantly improving overall efficiency of the storage system. This is accomplished, at least in part, by executing RMW operations on NVRAM drives in hardware rather than relying on software. Accordingly, a RMW engine can be implemented in the command/data path which will be responsible for ensuring that only full write operation commands and data associated therewith are passed to downstream logic. Moreover, implementing CAM in hardware allows for search operations performed in a LBA table to be completed in a single clock cycle, thereby drastically reducing time delays.

As mentioned above, one or more of the processes included in method 500 may be performed by a RMW handler module and/or a controller included therein. Looking specifically to FIG. 6A, a handler module 600 is illustrated in accordance with one embodiment. As an option, the present handler module 600 may be implemented in conjunction with features from any other embodiment listed herein, such as those described with reference to the other FIGS., such as FIG. 5. However, such handler module 600 and others presented herein may be used in various applications and/or in permutations which may or may not be specifically described in the illustrative embodiments listed herein. Further, the handler module 600 presented herein may be used in any desired environment. Thus FIG. 6A (and the other FIGS.) may be deemed to include any possible permutation.

Figures 6A, 6B:
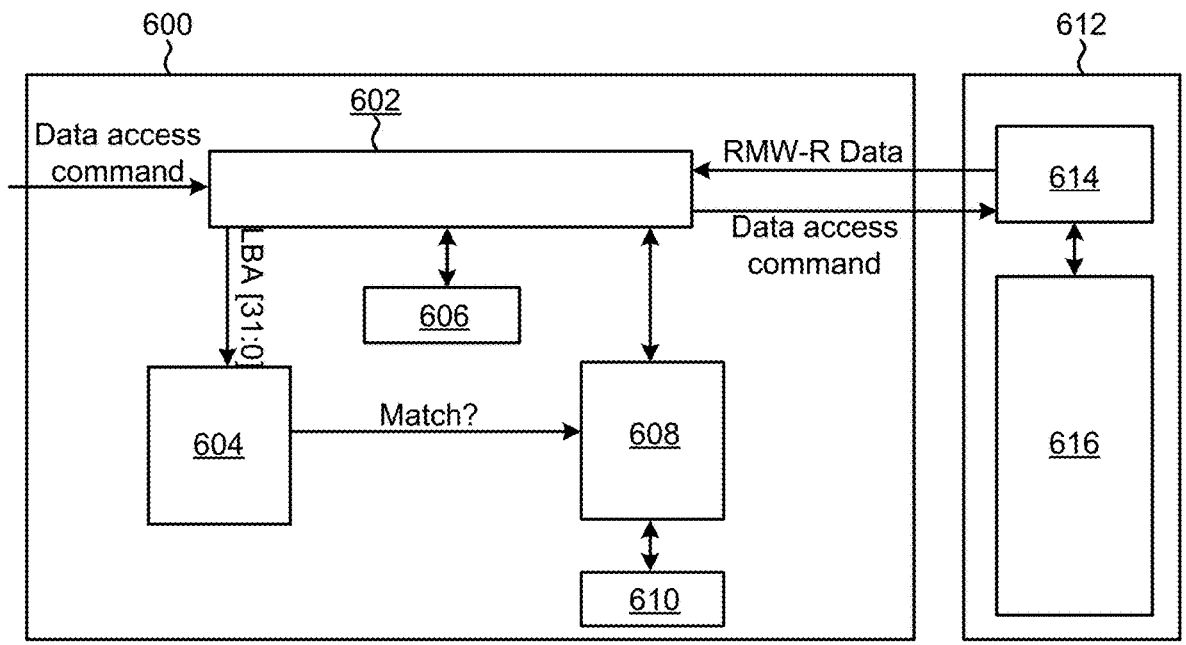
FIG. 6A is a partial schematic view of a handler module, in accordance with one embodiment.
FIG. 6B is a partial representational view of a sub-Lpage state table, in accordance with one embodiment.

The specific handler module 600 depicted in FIG. 6A is an exemplary sub-Lpage RMW handler module which has CAM assist capabilities, e.g., as will soon become apparent. As shown, the handler module 600 includes a number of components which process information based on data access commands which are received. These data access commands may be received from a user, a central storage controller, a remote storage location over a network connection, etc., depending on the approach. The actual data access commands which are received also vary depending on the given approach.

Specifically, a controller 602 receives the data access command(s) and processes them accordingly, e.g., by performing any one or more of the processes described above with respect to method 500. Accordingly, the controller 602 may include any desired types and/or amount of control logic. The controller 602 is also coupled to a CAM module 604, SLDM 606, and a RMW engine 608 which is in turn coupled to a SLST 610.

Looking specifically to the different types of information exchanged between the various components included in the handler module 600, the controller 602 receives a data access command and provides the LBA associated with the data access command (here "LBA [31:1]") to the CAM module 604. As described above, the CAM module 604 is able to determine whether any active RMW operations correspond to the LBA associated with the received data access command in a single clock cycle. Accordingly, the handler module 600 is able to significantly improve partial write operation performance by executing the corresponding RMW operations on NVRAM drives in hardware rather than relying on software.

The specific design (e.g., size) and/or configuration of the CAM module 604 may vary depending on the desired approach. According to an example, which is in no way intended to limit the invention, the CAM module 604 may have a design of 256×32. In another example, the CAM module 604 may have a design of 64×32 (e.g., see FIG. 6C below).

Again, the CAM module 604 determines whether any active RMW operations correspond to the LBA associated with the received data access command in a single clock cycle, and provide a result of such determination to the RMW engine 608. Accordingly, the RMW engine 608 can be implemented in the command/data path which is responsible for ensuring that only full write operation commands and data associated therewith are passed to downstream logic and/or components.

The RMW engine 608 also has indirect access to the SLDM 606 through the controller 602. Accordingly, the RMW engine 608 is able to utilize the SLDM 606 in order to stage sub-Lpage system write data blocks until either the handler module 600 (or overarching storage system) follows up with the remaining blocks of the given Lpage or an active RMW operation returns with any associated background data. However, full-Lpage write commands (and the corresponding data) are issued to the NVRAM without consulting the SLDM 606.

The SLST 610 is also used to maintain state over, and store command information for, all in-progress RMW operations. Thus, as read and/or write commands are received at the handler module 600, the SLST 610 is searched based on the LBA which corresponds to a respective active entry. New entries are also added to the SLST 610 each time a sub-Lpage write command is received and processed. Moreover, when the read portion of a RMW operation is completed, the corresponding location in the SLST 610 is looked up based on the LBA which is also returned with data read. The LBA address is presented to the CAM as the search pattern in order to obtain the address in the SLST where the pertinent data for this RMW context is stored. In some approaches, SLST 610 is looked up based on indexing information which may be stored in another TAG Index memory (not shown).

Referring momentarily to FIG. 6B, an illustrative implementation of the SLST 610 in FIG. 6A is depicted in accordance with one embodiment, which is in no way intended to limit the invention. As shown, the SLST 610 includes a number of rows which each correspond to a different SLST Address as indicated in the Addr column. According to exemplary approaches, these SLST Addresses are used to index into an associated SLDM buffer memory, e.g., as would be appreciated by one skilled in the art after reading the present description.

The Valid [1] (42) column is used to indicate whether a valid active RMW context is running for each of the associated LBA entries. Moreover, the Read Comp Drop [1] (41) column is used to signal whether the data received as a result of the read portion of the respective RMW operation, should be dropped (e.g., ignored). This occurs in situations which involve a sub-Lpage write operation which has been fully coalesced, or another full-Lpage write operation corresponding to the same LBA is received. The Read Pending [1] (40) column indicates the corresponding head of line blocking indicator which is read for in-progress coalescing purposes, e.g., as would be appreciated by one skilled in the art after reading the present description. Further still, the Buff_State [8] (39:31) column provides a per bit indicator of valid foreground sectors received from the system, which can include 8B, 16B, 32B, etc. logical page (Lpage) sizes. Finally, the LBA [31] (31:0) column lists the LBA associated with each of the respective entries.

Returning back to FIG. 6A, the CAM module 604 is a unique type of memory storage device which is used in significantly high-speed searching applications. The CAM module 604 operates by comparing an input search pattern (or string) against a table of stored data, and returns the address of matching data when found. Alternatively, an indication that the pattern does not exist in the table is returned when a match is not found. When the search pattern is found, it is referred to as a "CAM hit". For write operations, the CAM module 604 essentially behaves like RAM, where a specific address is used to change the contents of an associated memory location. However, for read operations the data/pattern is provided to the CAM module 604 and the memory address of that data/pattern is returned if it exists in the CAM module 604. For RMW operations as described herein, the address returned by the CAM module 604 is used to index directly into the SLST 610 to obtain state information for an RMW context, e.g., as would be appreciated by one skilled in the art after reading the present description.

The controller 602 is further coupled to the downstream NVRAM 612. Specifically, the controller 602 is coupled to a storage controller 614 in the NVRAM 612, which in turn communicates with the physical data storage modules 616. The handler module 600 is thereby able to send specific data access commands and/or data to the NVRAM 612 as well as receive data read from the NVRAM 612, e.g., as part of a RMW operation. It should be noted that the NVRAM 612 may include any desired type of memory, e.g., depending on the desired approach. For example, in some approaches the NVRAM 612 includes Flash memory. In further approaches, the NVRAM 612 includes NAND Flash memory.

Figure 6C:
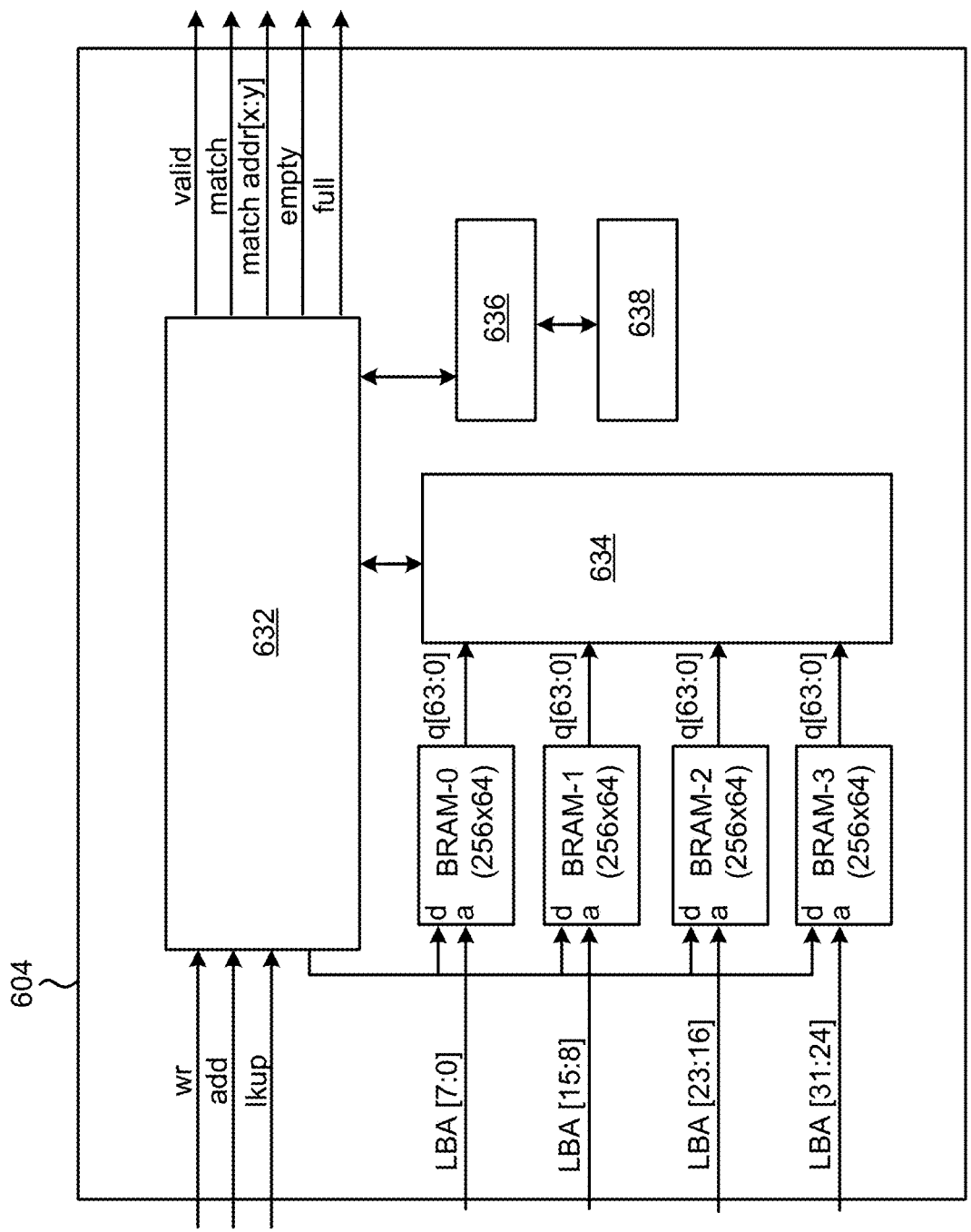
FIG. 6C is a partial schematic view of a CAM module, in accordance with one embodiment.

Referring now to FIG. 6C, an illustrative implementation of the CAM module 604 in FIG. 6A is depicted in accordance with one embodiment, which is in no way intended to limit the invention. As shown, the CAM module 604 has a 64×32 design (e.g., size) and is therefore capable of storing up to 64, 32 bit patterns. The CAM module 604 is also able to provide a fixed single cycle search latency for any pattern in the CAM, e.g., as described herein.

The CAM controller 632 receives various data access command prompts wr, add, lkup, and processes them accordingly, e.g., as would be appreciated by one skilled in the art after reading the present description. For instance, each of the four 256×64 bit BRAMs (BRAM-0, BRAM-1, BRAM-2, BRAM-3) in the CAM module 604 provide 8 bits of pattern search and 64 storage locations. The 8 bits of pattern search correspond to the input address of the respective BRAM, while each of the 64 storage locations correspond to a respective one of the 64 bit-lanes of the output data bus q[63:0]. According to an example, which is in no way intended to limit the invention, when a write operation is performed on the CAM module 604, a single bit is set for that unique address in one of the 64 memory location bit-lanes across all four BRAMs (e.g., the same bit-lane for each BRAM). Thus, when a "Look-Up" operation is performed on the CAM module 604, the match logic module 634 searches for a logic "one" across all four BRAMS in the same bit-lane. When a given bit-lane within the data bus of all four BRAMs is active, there is a match or CAM "hit".

The CAM pointer manager 636 includes a finite state machine in preferred approaches which is able to load up a small internal 64×6 FIFO with available CAM addresses. The FIFO may alternatively be implemented in the CAM pointer manager memory 638 in some approaches. Upon initialization of the CAM module 604 and/or the overarching storage system, all addresses in the CAM are available, and therefore the FIFO in the CAM pointer manager 636 is full. However, as items are added to the CAM module 604, pointers are incrementally used. Similarly, as items are removed from the CAM module 604 the pointers are returned into the pointer FIFO of the CAM pointer manager 636 and thereby made available again. It follows that an empty CAM pointer FIFO in the CAM pointer manager 636 indicates that the CAM module 604 is full and cannot take any more entries. In such situations, operation may be halted and/or remedial operations may be performed in order to maintain operation.

The CAM module 604 outputs a variety of information depending on whether a match was identified. According to the exemplary embodiment illustrated in FIG. 6C, which is in no way intended to limit the invention, match signifies whether a match was actually identified, valid identifies whether the identified match is actually valid, and match addr [x:y] identifies the address at which the match is located. While match addr [x:y] identifies an address in hexadecimal form in some approaches, the address can be referenced using any desired type of identification scheme. Furthermore, empty and full identify whether the CAM module includes any entries stored therein.

Again, various ones of the embodiments included herein are able to ensure that read and/or write coherency is maintained for RMW operations while also significantly improving overall efficiency of the storage system. This is accomplished, at least in part, by executing RMW operations on NVRAM drives in hardware rather than relying on software. Accordingly, a RMW engine can be implemented in the command/data path which will be responsible for ensuring that only full write operation commands and data associated therewith are passed to downstream logic. Moreover, implementing CAMs in hardware allows for search operations performed in LBA tables to be completed in a single clock cycle, thereby drastically reducing time delays experienced while satisfying data access commands. Operating efficiency of the overall storage system is thereby significantly improved.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Figure 7:
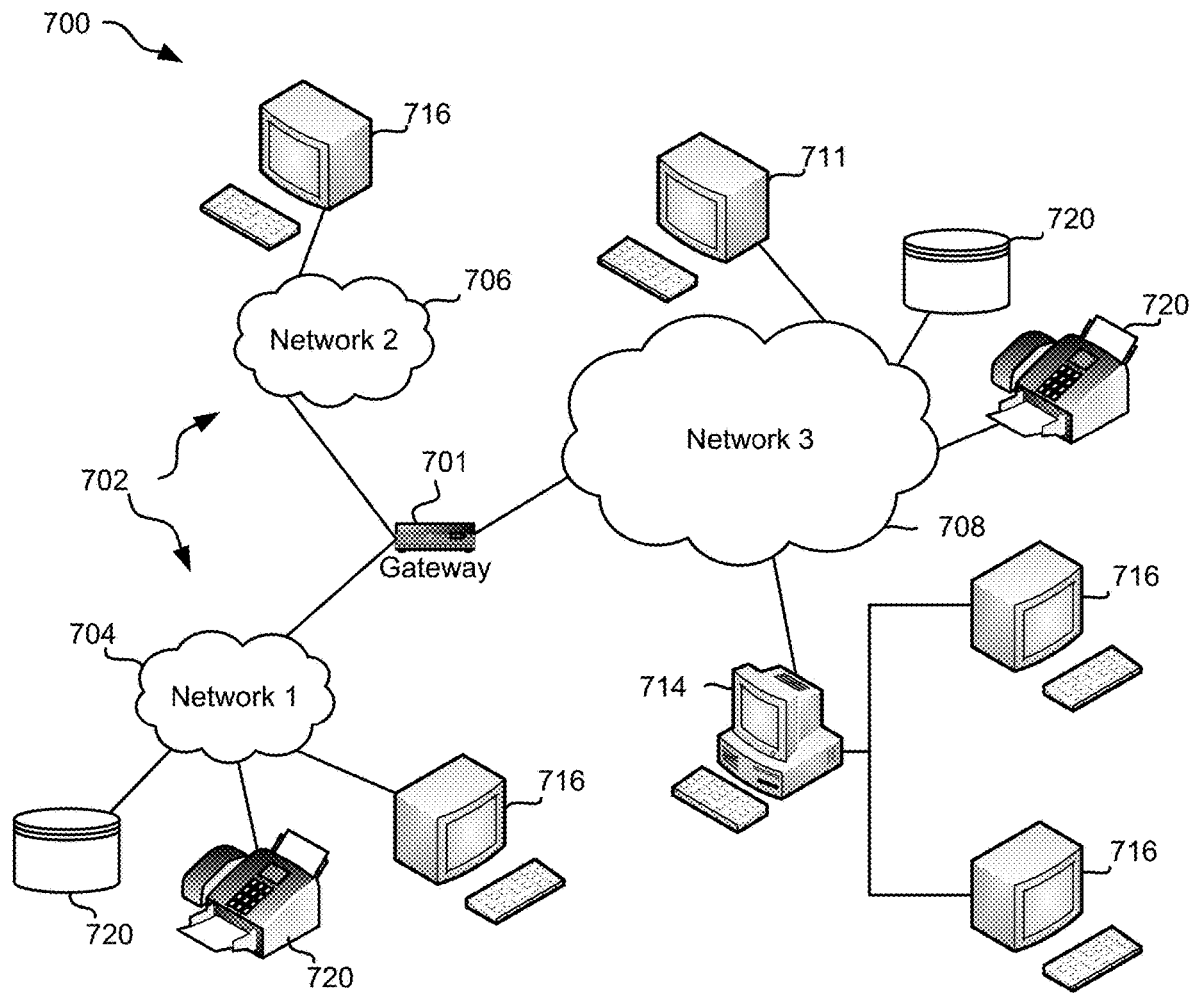
FIG. 7 is a network architecture, in accordance with one embodiment.

FIG. 7 illustrates a network architecture 700, in accordance with one embodiment. As shown in FIG. 7, a plurality of remote networks 702 are provided including a first remote network 704 and a second remote network 706. A gateway 701 may be coupled between the remote networks 702 and a proximate network 708. In the context of the present network architecture 700, the networks 704, 706 may each take any form including, but not limited to a LAN, a WAN such as the Internet, public switched telephone network (PSTN), internal telephone network, etc.

In use, the gateway 701 serves as an entrance point from the remote networks 702 to the proximate network 708. As such, the gateway 701 may function as a router, which is capable of directing a given packet of data that arrives at the gateway 701, and a switch, which furnishes the actual path in and out of the gateway 701 for a given packet.

Further included is at least one data server 714 coupled to the proximate network 708, and which is accessible from the remote networks 702 via the gateway 701. It should be noted that the data server(s) 714 may include any type of computing device/groupware. Coupled to each data server 714 is a plurality of user devices 716. Such user devices 716 may include a desktop computer, laptop computer, handheld computer, printer, and/or any other type of logic-containing device. It should be noted that a user device 711 may also be directly coupled to any of the networks, in some embodiments.

A peripheral 720 or series of peripherals 720, e.g., facsimile machines, printers, scanners, hard disk drives, networked and/or local data storage units or systems, etc., may be coupled to one or more of the networks 704, 706, 708. It should be noted that databases and/or additional components may be utilized with, or integrated into, any type of network element coupled to the networks 704, 706, 708. In the context of the present description, a network element may refer to any component of a network.

According to some embodiments, methods and systems described herein may be implemented with and/or on virtual systems and/or systems which emulate one or more other systems, such as a UNIX system which virtually hosts a MICROSOFT WINDOWS environment, etc. This virtualization and/or emulation may be enhanced through the use of VMWARE software, in some embodiments.

In other embodiments, one or more networks 704, 706, 708, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 8:
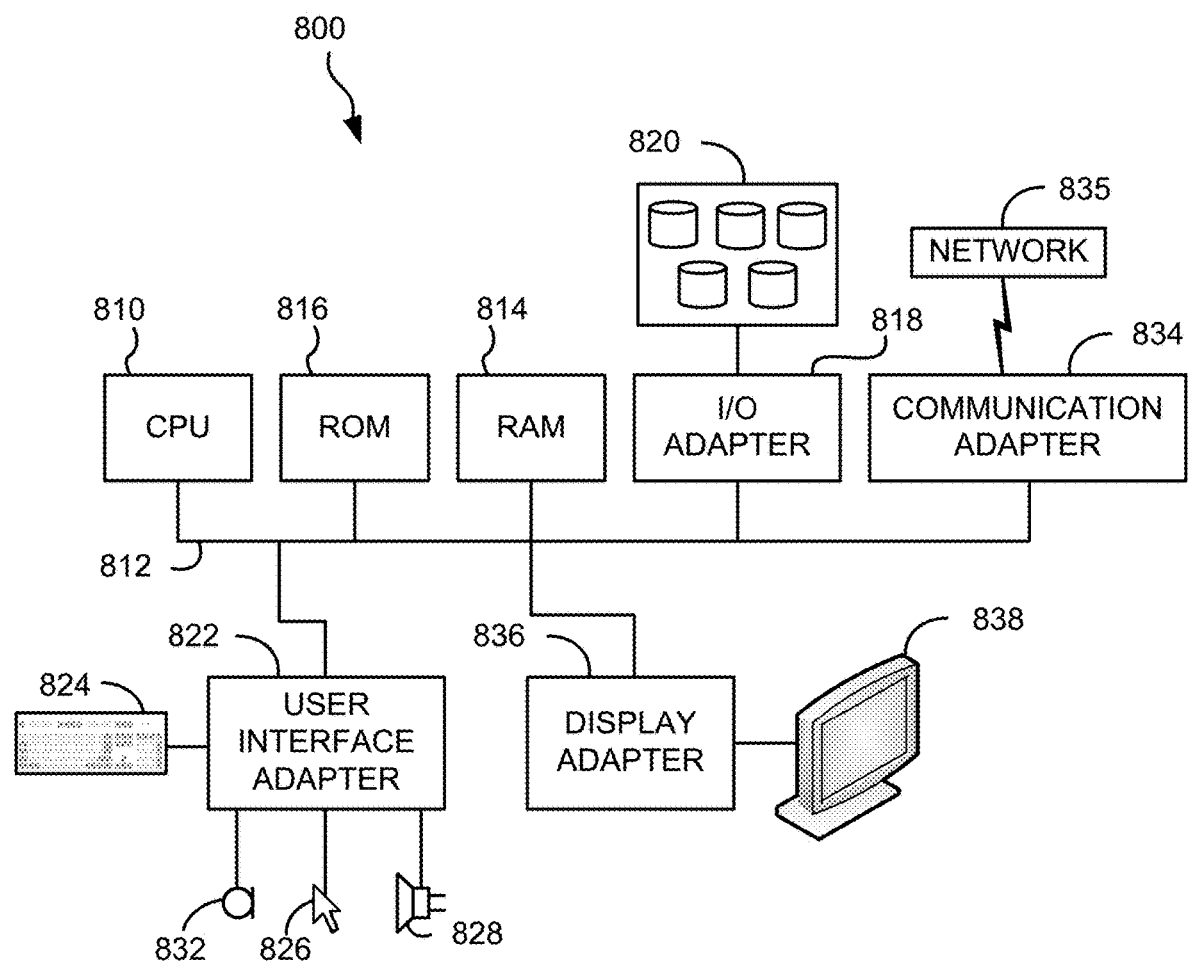
FIG. 8 is a representative hardware environment that may be associated with the servers and/or clients of FIG. 7, in accordance with one embodiment.

FIG. 8 shows a representative hardware environment associated with a user device 716 and/or server 714 of FIG. 7, in accordance with one embodiment. FIG. 8 illustrates a typical hardware configuration of a processor system 800 having a central processing unit 810, such as a microprocessor, and a number of other units interconnected via a system bus 812, according to one embodiment. In some embodiments, central processing unit 810 may include any of the approaches described above with reference to the one or more processors 210 of FIG. 2.

The processor system 800 shown in FIG. 8 includes a Random Access Memory (RAM) 814, Read Only Memory (ROM) 816, and an I/O adapter 818. According to some embodiments, which are in no way intended to limit the invention, I/O adapter 818 may include any of the approaches described above with reference to I/O adapter 218 of FIG. 2. Referring still to processor system 800 of FIG. 8, the aforementioned components 814, 816, 818 may be used for connecting peripheral devices such as storage subsystem 820 to the bus 812. In some embodiments, storage subsystem 820 may include a similar and/or the same configuration as data storage system 220 of FIG. 2. According to an example, which is in no way intended to limit the invention, storage subsystem 820 may include non-volatile data storage cards, e.g., having NVRAM memory cards, RAM, ROM, and/or some other known type of non-volatile memory, in addition to RAID controllers as illustrated in FIG. 2.

With continued reference to FIG. 8, a user interface adapter 822 for connecting a keyboard 824, a mouse 826, a speaker 828, a microphone 832, and/or other user interface devices such as a touch screen, a digital camera (not shown), etc., to the bus 812.

Processor system 800 further includes a communication adapter 834 which connects the processor system 800 to a communication network 835 (e.g., a data processing network) and a display adapter 836 which connects the bus 812 to a display device 838.

The processor system 800 may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 9:
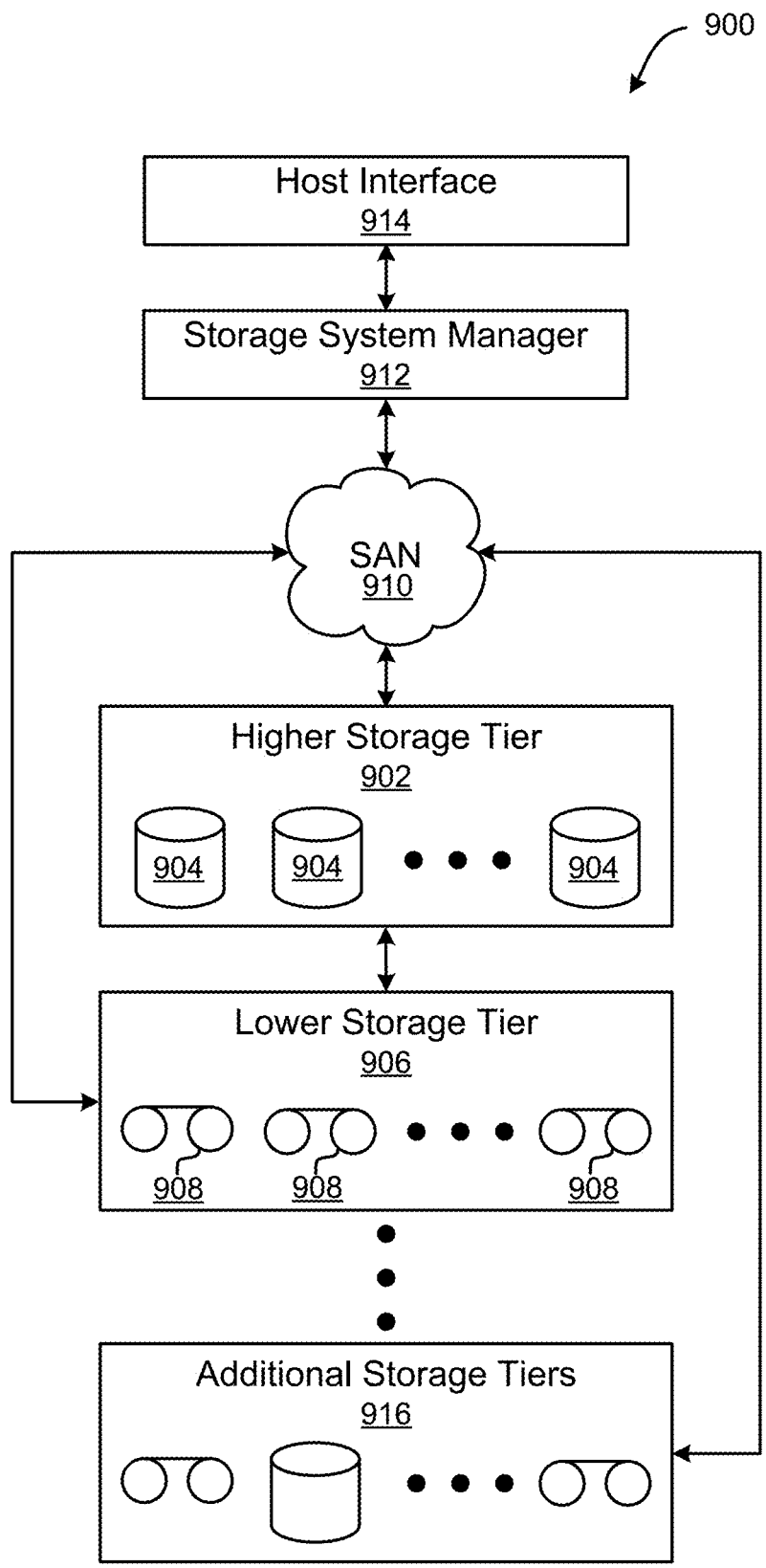
FIG. 9 is a tiered data storage system in accordance with one embodiment.

Moreover, FIG. 9 illustrates a storage system 900 which implements high level (e.g., SSD) storage tiers in combination with lower level (e.g., magnetic tape) storage tiers, according to one embodiment. Note that some of the elements shown in FIG. 9 may be implemented as hardware and/or software, according to various embodiments. The storage system 900 may include a storage system manager 912 for communicating with a plurality of media on at least one higher storage tier 902 and at least one lower storage tier 906. However, in other approaches, a storage system manager 912 may communicate with a plurality of media on at least one higher storage tier 902, but no lower storage tier. The higher storage tier(s) 902 preferably may include one or more random access and/or direct access media 904, such as hard disks, nonvolatile memory (NVM), NVRAM), solid state memory in SSDs, flash memory, SSD arrays, flash memory arrays, etc., and/or others noted herein or known in the art. According to illustrative examples, FIGS. 3-4 show exemplary architectures of SSD systems which may be used as a higher storage tier 902 depending on the desired embodiment.

Referring still to FIG. 9, the lower storage tier(s) 906 preferably includes one or more lower performing storage media 908, including sequential access media such as magnetic tape in tape drives and/or optical media, slower accessing HDDs, slower accessing SSDs, etc., and/or others noted herein or known in the art. One or more additional storage tiers 916 may include any combination of storage memory media as desired by a designer of the system 900. Thus, the one or more additional storage tiers 916 may, in some approaches, include a SSD system architecture similar or the same as those illustrated in FIGS. 1-2. Also, any of the higher storage tiers 902 and/or the lower storage tiers 906 may include any combination of storage devices and/or storage media.

The storage system manager 912 may communicate with the storage media 904, 908 on the higher storage tier(s) 902 and lower storage tier(s) 906 through a network 910, such as a storage area network (SAN), as shown in FIG. 9, or some other suitable network type. The storage system manager 912 may also communicate with one or more host systems (not shown) through a host interface 914, which may or may not be a part of the storage system manager 912. The storage system manager 912 and/or any other component of the storage system 900 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 900 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 902, may include a majority of SSD storage media for storing data in a higher performing storage environment, and remaining storage tiers, including lower storage tier 906 and additional storage tiers 916 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 902, while data not having one of these attributes may be stored to the additional storage tiers 916, including lower storage tier 906. Of course, one of skill in the art, upon reading the present descriptions, may devise many other combinations of storage media types to implement into different storage schemes, according to the embodiments presented herein.

According to some embodiments, the storage system (such as 900) may include logic configured to receive a request to open a data set, logic configured to determine if the requested data set is stored to a lower storage tier 906 of a tiered data storage system 900 in multiple associated portions, logic configured to move each associated portion of the requested data set to a higher storage tier 902 of the tiered data storage system 900, and logic configured to assemble the requested data set on the higher storage tier 902 of the tiered data storage system 900 from the associated portions.

Of course, this logic may be implemented as a method on any device and/or system or as a computer program product, according to various embodiments.

What is claimed is:

1. A computer-implemented method, comprising:
  receiving a data access command which corresponds to data stored on non-volatile random access memory (NVRAM) at a logical block address;
  using content-addressable memory (CAM) to determine whether the logical block address corresponds to an active read modify write operation;
  in response to determining that the logical block address corresponds to an active read modify write operation, satisfying the data access command using a first procedure; and
  in response to determining that the logical block address does not correspond to an active read modify write operation, satisfying the data access command using a second procedure,
  wherein using the CAM to determine whether the logical block address corresponds to an active read modify write operation is completed in a single clock cycle of the CAM,
  wherein the data access command is a full-Lpage write command, wherein satisfying the data access command using the first procedure in response to determining that the logical block address corresponds to an active read modify write operation includes:
    terminating the active read modify write operation by disregarding any data returned by the read modify write operation and dismissing a remainder of the operation, and
    issuing the full-Lpage write command to the NVRAM,
  wherein disregarding any data returned by the read modify write operation includes:
    marking the data returned by the read modify write operation for garbage collection by setting a drop bit.

2. The computer-implemented method of claim 1, comprising:
  receiving a read command which corresponds to data stored on NVRAM at a second logical block address;
  using the CAM to determine whether the second logical block address corresponds to an active read modify write operation; and in response to determining that the second logical block address corresponds to a second active read modify write operation, satisfy the read command by:
  holding the read command until the second active read modify write operation is completed, and
  issuing the read command to the NVRAM in response to determining that the second active read modify write operation has been completed.

3. The computer-implemented method of claim 1, comprising:
  receiving a sub-Lpage write command which corresponds to data stored on NVRAM at a second logical block address;
  using the CAM to determine whether the second logical block address corresponds to an active read modify write operation; and
  in response to determining that the second logical block address corresponds to a second active read modify write operation, satisfy the sub-Lpage write command by:
    assigning the sub-Lpage write command to a buffer,
    issuing a read command to the NVRAM for the second logical block address,
    receiving data read from a physical block address correlated to the second logical block address,
    coalescing the data read from the physical block address with data included in the sub-Lpage write command, and
    issuing the sub-Lpage write command to the NVRAM.

4. The computer-implemented method of claim 1, wherein using the CAM to determine whether the logical block address corresponds to an active read modify write operation is completed in a single clock cycle of the CAM irrespective of a size of the CAM.

5. The computer-implemented method of claim 1, wherein using the CAM to determine whether the logical block address corresponds to an active read modify write operation includes:
  determining whether the logical block address is currently stored in the CAM.

6. The computer-implemented method of claim 1, wherein the NVRAM is NAND Flash memory.

7. A computer program product comprising a computer readable storage medium having program instructions embodied therewith, the program instructions readable and/or executable by a processor to cause the processor to:
  receive, by the processor, a data access command which corresponds to data stored on non-volatile random access memory (NVRAM) at a logical block address;
  use, by the processor, content-addressable memory (CAM) to determine whether the logical block address corresponds to an active read modify write operation;
  in response to determining that the logical block address corresponds to an active read modify write operation, satisfy, by the processor, the data access command using a first procedure; and
  in response to determining that the logical block address does not correspond to an active read modify write operation, satisfy, by the processor, the data access command using a second procedure,
  wherein using the CAM to determine whether the logical block address corresponds to an active read modify write operation is completed in a single clock cycle of the CAM,
  wherein the data access command is a full-Lpage write command, wherein satisfying the data access command using the first procedure in response to determining that the logical block address corresponds to an active read modify write operation includes:
    terminating the active read modify write operation by disregarding any data returned by the read modify write operation and dismissing a remainder of the operation, and
    issuing the full-Lpage write command to the NVRAM,
  wherein disregarding any data returned by the read modify write operation includes:
    marking the data returned by the read modify write operation for garbage collection by setting a drop bit.

8. The computer program product of claim 7, wherein the program instructions are readable and/or executable by the processor to cause the processor to:
  receive, by the processor, a read command which corresponds to data stored on NVRAM at a second logical block address;
  use, by the processor, the CAM to determine whether the second logical block address corresponds to an active read modify write operation; and
  in response to determining that the second logical block address corresponds to a second active read modify write operation, satisfy, by the processor, the read command by:
    holding the read command until the second active read modify write operation is completed, and
    issuing the read command to the NVRAM in response to determining that the second active read modify write operation has been completed.

9. The computer program product of claim 7, wherein disregarding any data returned by the read modify write operation includes:
  marking the data returned by the read modify write operation as unusable.

10. The computer program product of claim 7, wherein the program instructions are readable and/or executable by the processor to cause the processor to:
  receive, by the processor, a sub-Lpage write command which corresponds to data stored on NVRAM at a second logical block address;
  use, by the processor, the CAM to determine whether the second logical block address corresponds to an active read modify write operation; and
  in response to determining that the second logical block address corresponds to a second active read modify write operation, satisfy, by the processor, the sub-Lpage write command by:
    determining whether the second active read modify write operation has been satisfied,
    in response to determining that the second active read modify write operation has been satisfied, assigning the sub-Lpage write command to a buffer,
    issuing a read command to the NVRAM for the second logical block address,
    receiving data read from a physical block address correlated to the second logical block address,
    coalescing the data read from the physical block address with data included in the sub-Lpage write command, and
    issuing the sub-Lpage write command to the NVRAM.

11. The computer program product of claim 7, wherein using the CAM to determine whether the logical block address corresponds to an active read modify write operation is completed in a single clock cycle of the CAM irrespective of a size of the CAM.

12. The computer program product of claim 7, wherein using the CAM to determine whether the logical block address corresponds to an active read modify write operation includes:
determining whether the logical block address is currently stored in the CAM.

13. The computer program product of claim 7, wherein the NVRAM is NAND Flash memory.

14. A system, comprising:
a plurality of non-volatile random access memory (NVRAM) blocks configured to store data; and
a processor and logic integrated with and/or executable by the processor, the logic being configured to:
receive, by the processor, a data access command which corresponds to data stored on non-volatile random access memory (NVRAM) at a logical block address;
use, by the processor, content-addressable memory (CAM) to determine whether the logical block address corresponds to an active read modify write operation by determining whether the logical block address is currently stored in the CAM;
in response to determining that the logical block address corresponds to an active read modify write operation, satisfy, by the processor, the data access command using a first procedure; and
in response to determining that the logical block address does not correspond to an active read modify write operation, satisfy, by the processor, the data access command using a second procedure,
wherein using the CAM to determine whether the logical block address corresponds to an active read modify write operation is completed in a single clock cycle of the CAM irrespective of a size of the CAM,
wherein the data access command is a full-Lpage write command, wherein satisfying the data access command using the first procedure in response to determining that the logical block address corresponds to an active read modify write operation includes:
terminating the active read modify write operation by disregarding any data returned by the read modify write operation and dismissing a remainder of the operation, and
issuing the full-Lpage write command to the NVRAM,
wherein disregarding any data returned by the read modify write operation includes:
marking the data returned by the read modify write operation for garbage collection by setting a drop bit.

15. The system of claim 14, wherein the logic is configured to:
receive, by the processor, a read command which corresponds to data stored on NVRAM at a second logical block address;
use, by the processor, the CAM to determine whether the second logical block address corresponds to an active read modify write operation; and
in response to determining that the second logical block address corresponds to a second active read modify write operation, satisfy, by the processor, the read command by:
holding the read command until the second active read modify write operation is completed, and
issuing the read command to the NVRAM in response to determining that the second active read modify write operation has been completed.

16. The system of claim 14, wherein the logic is configured to:
receive, by the processor, a sub-Lpage write command which corresponds to data stored on NVRAM at a second logical block address;
use, by the processor, the CAM to determine whether the second logical block address corresponds to an active read modify write operation; and
in response to determining that the second logical block address corresponds to a second active read modify write operation, satisfy, by the processor, the sub-Lpage write command by:
determining whether the second active read modify write operation has been satisfied,
in response to determining that the second active read modify write operation has not been satisfied, holding the sub-Lpage write command for a predetermined amount of time,
in response to determining that the second active read modify write operation has been satisfied, assigning the sub-Lpage write command to a sub-Lpage state table in a sub-Lpage data memory,
issuing a read command to the NVRAM for the second logical block address, wherein issuing the read command includes using a logical to physical table to identify a physical block address correlated to the second logical block address,
receiving data read from the physical block address correlated to the second logical block address,
coalescing the data read from the physical block address with data included in the sub-Lpage write command, and
issuing the sub-Lpage write command to the NVRAM
receive, by the processor, a read command which corresponds to data stored on NVRAM at a third logical block address;
use, by the processor, the CAM to determine whether the third logical block address corresponds to an active read modify write operation; and
in response to determining that the third logical block address corresponds to a third active read modify write operation, satisfy, by the processor, the read command by:
holding the read command until the third active read modify write operation is completed, and
issuing the read command to the NVRAM in response to determining that the third active read modify write operation has been completed.

17. The system of claim 14, wherein the logic is configured to:
receive, by the processor, a sub-Lpage write command which corresponds to data stored on NVRAM at a second logical block address;
use, by the processor, the CAM to determine whether the second logical block address corresponds to an active read modify write operation; and
in response to determining that the second logical block address corresponds to a second active read modify write operation, satisfy, by the processor, the sub-Lpage write command by:
determining whether the second active read modify write operation has been satisfied,
in response to determining that the second active read modify write operation has not been satisfied, holding the sub-Lpage write command for a predetermined amount of time, in response to determining that the second active read modify write operation has been satisfied, assigning the sub-Lpage write command to a sub-Lpage state table in a sub-Lpage data memory, issuing a read command to the NVRAM for the second logical block address, wherein issuing the read command includes using a logical to physical table to identify a physical block address correlated to the second logical block address, receiving data read from the physical block address correlated to the second logical block address, coalescing the data read from the physical block address with data included in the sub-Lpage write command, and issuing the sub-Lpage write command to the NVRAM.

18. The system of claim 14, wherein the NVRAM is NAND Flash memory.

* * * * *